United States Patent
Tsukada et al.

(10) Patent No.: US 12,014,573 B2
(45) Date of Patent: Jun. 18, 2024

(54) IMAGE PROCESSING DEVICE, AUTHENTICATION SYSTEM, IMAGE PROCESSING METHOD, AUTHENTICATION METHOD, AND RECORDING MEDIUM

(71) Applicant: NEC Corporation, Tokyo (JP)

(72) Inventors: Masato Tsukada, Tokyo (JP); Chisato Funayama, Tokyo (JP); Yuka Ogino, Tokyo (JP); Hiroshi Imai, Tokyo (JP); Keiichi Chono, Tokyo (JP); Emi Kitagawa, Tokyo (JP); Yasuhiko Yoshida, Tokyo (JP); Hiroshi Yamada, Tokyo (JP); Takashi Shibata, Tokyo (JP); Shoji Yachida, Tokyo (JP); Ryuichi Akashi, Tokyo (JP)

(73) Assignee: NEC CORPORATION, Tokyo (JP)

(*) Notice: Subject to any disclaimer, the term of this patent is extended or adjusted under 35 U.S.C. 154(b) by 459 days.

(21) Appl. No.: 17/312,094

(22) PCT Filed: Dec. 14, 2018

(86) PCT No.: PCT/JP2018/046123
§ 371 (c)(1),
(2) Date: Jun. 9, 2021

(87) PCT Pub. No.: WO2020/121520
PCT Pub. Date: Jun. 18, 2020

(65) Prior Publication Data
US 2022/0027647 A1    Jan. 27, 2022

(51) Int. Cl.
*G06V 40/18*    (2022.01)
*G06F 21/32*    (2013.01)
(Continued)

(52) U.S. Cl.
CPC .............. *G06V 40/18* (2022.01); *G06F 21/32* (2013.01); *G06V 10/143* (2022.01); *G06V 10/56* (2022.01);
(Continued)

(58) Field of Classification Search
CPC ........ G06V 40/18; G06V 10/56; G06V 40/40; G06V 10/143; G06V 40/19; G06V 40/193; G06F 21/32
See application file for complete search history.

(56) References Cited

U.S. PATENT DOCUMENTS

2007/0171297 A1*  7/2007  Namgoong ............ H04N 23/56
                                                      348/362
2013/0223681 A1*  8/2013  Lee ...................... G06V 40/171
                                                      382/103
(Continued)

FOREIGN PATENT DOCUMENTS

JP    H1090750 A    4/1998
JP    2002312772 A    10/2002
(Continued)

OTHER PUBLICATIONS

International Search Report of PCT Application No. PCT/JP2018/046123 dated Mar. 19, 2019.
(Continued)

*Primary Examiner* — Pinalben Patel

(57) ABSTRACT

In order to determine whether a color contact lens is being worn on an iris, this image processing device includes: a first feature amount calculation means for using an image of the iris in a first wavelength band to calculate a first feature amount in the first wavelength band, said iris being used in authentication of a person; a second feature amount calculation means for using an image of the iris in a second wavelength band to calculate a second feature amount in the second wavelength band; and a covering determination means for determining, on the basis of the first feature amount and the second feature amount, whether a color contact lens is present on the iris.

7 Claims, 11 Drawing Sheets

(51) Int. Cl.
   *G06V 10/143* (2022.01)
   *G06V 10/56* (2022.01)
   *G06V 40/19* (2022.01)
   *G06V 40/40* (2022.01)

(52) U.S. Cl.
   CPC ............ *G06V 40/19* (2022.01); *G06V 40/193* (2022.01); *G06V 40/40* (2022.01)

(56) References Cited

U.S. PATENT DOCUMENTS

| | | | |
|---|---|---|---|
| 2016/0019120 A1* | 1/2016 | Kono | G06F 3/0647 |
| | | | 711/162 |
| 2016/0019420 A1 | 1/2016 | Feng et al. | |
| 2018/0349721 A1* | 12/2018 | Agrawal | G06V 40/45 |
| 2020/0128203 A1 | 4/2020 | Hirono et al. | |

FOREIGN PATENT DOCUMENTS

| | | | |
|---|---|---|---|
| JP | 2003036434 A | 2/2003 |
| JP | 2006208204 A | 8/2006 |
| JP | 2018185749 A | 11/2018 |

OTHER PUBLICATIONS

English translation of Written opinion for PCT Application No. PCT/JP2018/046123 dated Mar. 19, 2019.

* cited by examiner

IMAGE PROCESSING DEVICE, AUTHENTICATION SYSTEM, IMAGE PROCESSING METHOD, AUTHENTICATION METHOD, AND RECORDING MEDIUM

This application is a National Stage Entry of PCT/JP2018/046123 filed on Dec. 14, 2018, the contents of all of which are incorporated herein by reference, in their entirety.

TECHNICAL FIELD

The disclosure relates to an image processing device and the like that process a biometric image.

BACKGROUND ART

Personal authentication is used to ensure security. However, authentication using an article that needs to be carried (for example, a security card) has a risk of forgetting to carry the article, losing the article due to theft, or the like. Therefore, authentication using biometrics (for example, a fingerprint or a palmprint) that does not require an article for authentication and can identify an individual is used.

An iris that adjusts an aperture diameter of a pupil has a unique pattern for each individual and is said to be unchanged for a lifetime. Therefore, the iris is used as one of the biometrics (see, for example, PTL 1).

In the authentication using the iris, an iris image registered in advance is compared with an iris image acquired at the time of authentication.

The personal identification device described in PTL 1 determines whether an eye is a prosthetic eye on the basis of the density of an image of a specific region of the eye such as an iris.

Note that the captured image is affected by illumination light or the like. Therefore, a technique for correcting an image in image processing has been proposed (see, for example, PTL 2).

CITATION LIST

Patent Literature

[PTL 1] JP 2002-312772 A
[PTL 2] JP 10-090750 A
[PTL 3] JP 2006-208204 A
[PTL 4] JP 2003-036434 A

SUMMARY OF INVENTION

Technical Problem

The color of an iris is different according to a proportion of a melanin pigment in the iris. The proportion of the melanin pigment in each individual is genetically determined. Therefore, the color of the iris is fixed for each individual similarly to the color of hair and the like.

However, in fashion and the like, the color of hair and the like is changed in order to match the color of clothing. The color of the iris is also changed.

To change the color of the iris, a color contact lens provided with a colored region in a portion related to the iris is used. The color contact lens may be used to make the iris look larger, in addition to changing the color of the iris.

The color contact lens is worn on an outer surface of a cornea. Therefore, when the color contact lens is worn, an image obtained by capturing the iris is a combination image of reflected light at the color contact lens, and transmitted light transmitted through the color contact lens in reflected light obtained by reflecting transmitted light of the color contact lens at the iris.

In this case, the captured image is different from an original iris image. That is, the image captured in the state of wearing the color contact lens is not suitable for the iris authentication.

Therefore, in the authentication using the iris image, it is desirable to determine whether the captured iris image is an image captured by wearing the color contact lens.

The color of the color contact lens may be a special color but is often a general iris color. Therefore, it is difficult to determine the presence or absence of wearing a color contact lens by simple determination using color.

Furthermore, the color contact lens does not change the color of a specific region in the iris but changes the color of the entire iris. Therefore, even if the density of the color of the specific region in the iris is used, it is difficult to determine the presence or absence of wearing the color contact lens.

The authentication device described in PTL1 determines whether an eye is a prosthetic eye by using a comparison between the density of at least one or more specific regions and a density reference value. Therefore, the authentication device described in PTL 1 cannot determine whether the color contact lens is worn on the iris.

An electronic control camera described in PTL 2 is an invention for improving color reproduction but is not related to a technique for determining wearing of a color contact lens.

An object of the disclosure is to solve the above problems and to provide an image processing device and the like for determining the presence or absence of wearing a color contact lens in an iris used for authentication.

Solution to Problem

An image processing device in one aspect of the disclosure includes:
  a first feature amount calculation unit that calculates a first feature amount in a first wavelength band using an image in the first wavelength band in an iris used for authentication of a person;
  a second feature amount calculation unit that calculates a second feature amount in a second wavelength band using an image in the second wavelength band in the iris; and
  a covering object determination unit that determines presence or absence of a color contact lens on the iris based on the first feature amount and the second feature amount.

An authentication system in one aspect of the disclosure includes:
  a capture device configured to capture an iris used for authentication of a person using a first wavelength band and a second wavelength band;
  an authentication device configured to authenticate the person using a determination result of presence or absence of a color contact lens on the iris;
  an information processing device configured to execute processing based on an authentication result of the authentication device; and
  an image processing device including
  a first feature amount calculation unit that calculates a first feature amount in the first wavelength band using an image in the first wavelength band, a second feature amount calculation unit that calculates a second feature amount in the second wavelength band using an image in the second wavelength band, and a covering object determination unit that determines presence or absence of the color contact lens on the iris based on the first feature amount and the second feature amount.

An authentication method in one aspect of the disclosure includes:

calculating a first feature amount in a first wavelength band using an image in the first wavelength band in an iris used for authentication of a person;

calculating a second feature amount in a second wavelength band using an image in the second wavelength band in the iris; and determining presence or absence of a color contact lens on the iris based on the first feature amount and the second feature amount.

An authentication method in another aspect of the disclosure includes:

by an image processing device included in an authentication system including a capture device configured to capture an iris used for authentication of a person using a first wavelength band and a second wavelength band, an authentication device configured to authenticate the person using a determination result of presence or absence of a color contact lens on the iris, and an information processing device configured to execute processing based on an authentication result of the authentication device, calculating a first feature amount in the first wavelength band using an image in the first wavelength band;

calculating a second feature amount in the second wavelength band using an image in the second wavelength band; and determining presence or absence of the color contact lens on the iris based on the first feature amount and the second feature amount.

A recording medium in one aspect of the disclosure records a program for causing a computer to execute:

processing of calculating a first feature amount in a first wavelength band using an image in the first wavelength band in an iris used for authentication of a person;

processing of calculating a second feature amount in a second wavelength band using an image in the second wavelength band in the iris; and processing of determining presence or absence of a color contact lens on the iris based on the first feature amount and the second feature amount.

A recording medium in another aspect of the disclosure records a program for causing a computer included in an authentication system including a capture device configured to capture an iris used for authentication of a person using a first wavelength band and a second wavelength band, an authentication device configured to authenticate the person using a determination result of presence or absence of a color contact lens on the iris, and an information processing device configured to execute processing based on an authentication result of the authentication device, to execute:

processing of calculating a first feature amount in the first wavelength band using an image in the first wavelength band;

processing of calculating a second feature amount in the second wavelength band using an image in the second wavelength band; and processing of determining presence or absence of the color contact lens on the iris based on the first feature amount and the second feature amount.

Advantageous Effects of Invention

According to the disclosure, an effect of determining the presence or absence of wearing a color contact lens in an iris used for authentication can be exerted.

EXAMPLE EMBODIMENT

Figure 1:
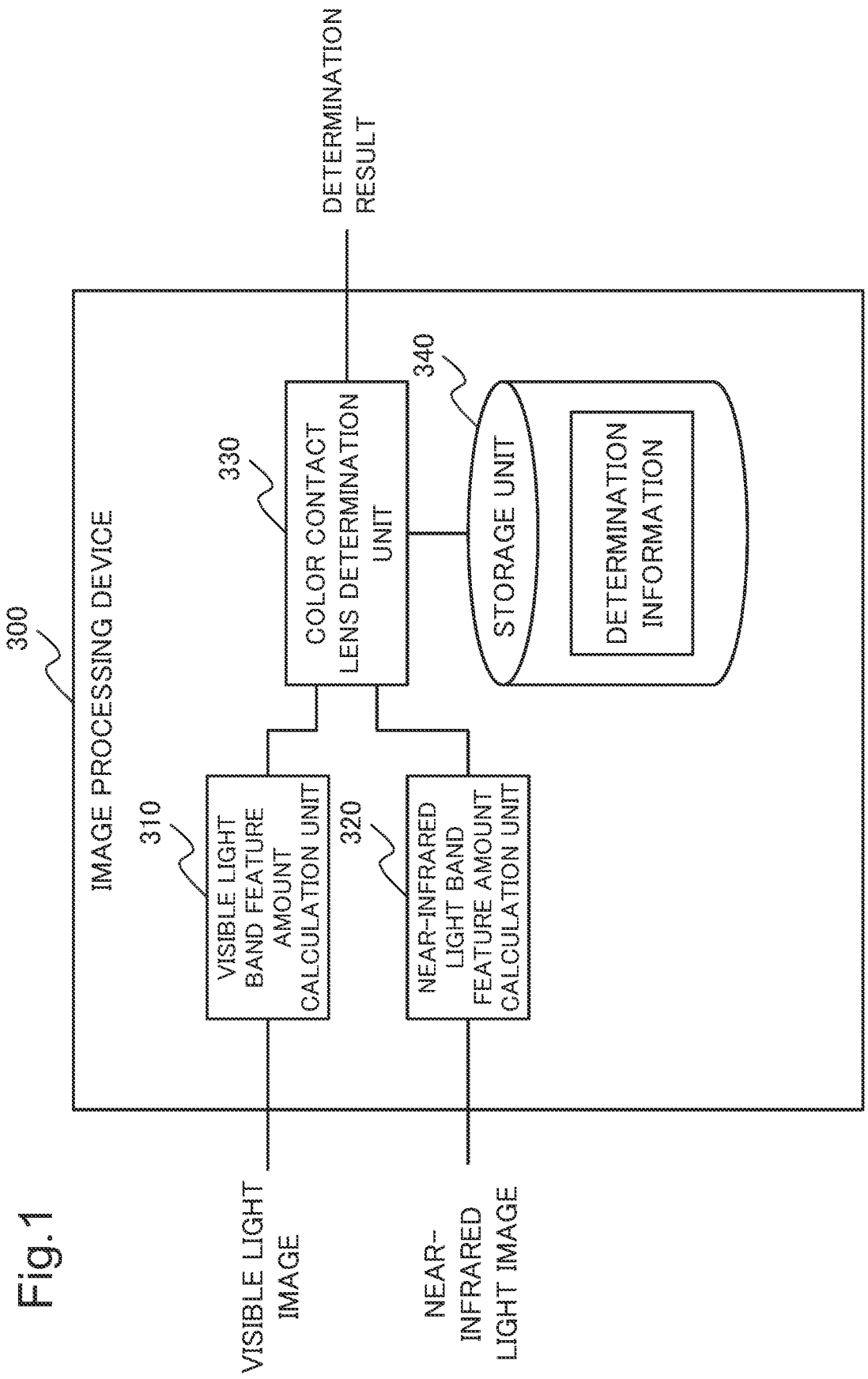
FIG. 1 is a block diagram illustrating an example of a configuration of an image processing device according to a first example embodiment.

Next, each example embodiment will be described with reference to the drawings.

Each drawing is for describing each example embodiment. The example embodiment is not limited to the illustration of each drawing. Furthermore, similar configurations in the drawings are given the same reference numerals, and repetitive description may be omitted. Furthermore, in the drawings used in the following description, description of configurations of portions not related to the description of each example embodiment may be omitted and not illustrated.

Description of Findings Related to Example Embodiments

A color contact lens is a contact lens to which a color and/or a design is applied among contact lenses. For example, the color contact lens is a contact lens in which a portion corresponding to an iris of an eye or a portion including the iris is colored. Alternatively, the color contact lens is a contact lens to which a design for changing the impression of the eye is applied. Alternatively, the color contact lens is a contact lens colored for improving visibility at the time of removal from a case or the like. The color contact lens is a contact lens colored other than the coloring for the purpose of improving the color of a material itself of the contact lens and/or a medical function (for example, removal of ultraviolet light and/or correcting vision).

Figure 11:
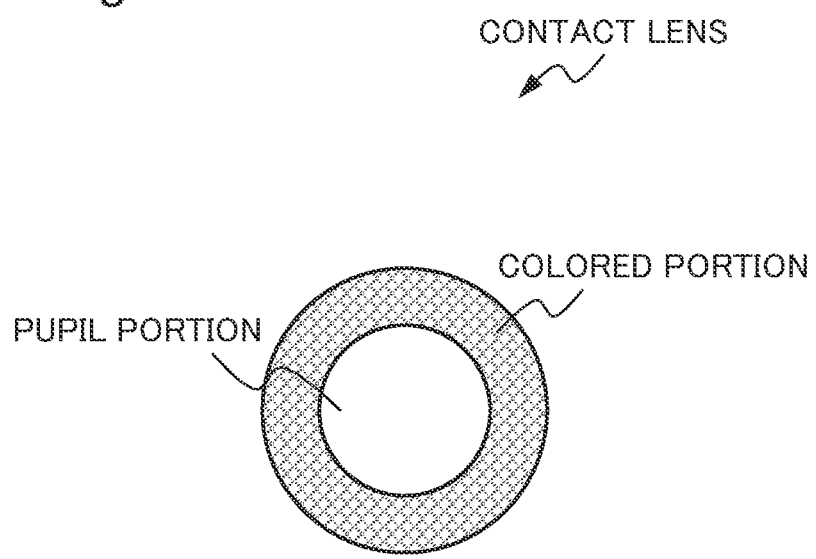
FIG. 11 is a diagram illustrating an example of a colored portion of a color contact lens.

FIG. 11 is a diagram illustrating an example of a colored portion of a color contact lens.

The colored portion of the color contact lens changes the color of the iris. Specifically, the colored portion of the color contact lens changes the color of the iris seen by others to a specific color. That is, the colored portion of the color contact lens changes reflected light in a specific range (for example, blue) in the visible light band. The colored portion of the color contact lens absorbs or transmits reflection in a band of light other than the visible light band to be changed in order to avoid reflection.

The color contact lens is directly worn on an eyeball (for example, a cornea outside the iris). However, in the following description, for convenience of description, the "iris when the color contact lens is worn on an eyeball" is simply referred to as the "iris when wearing the color contact lens".

Figure 4:
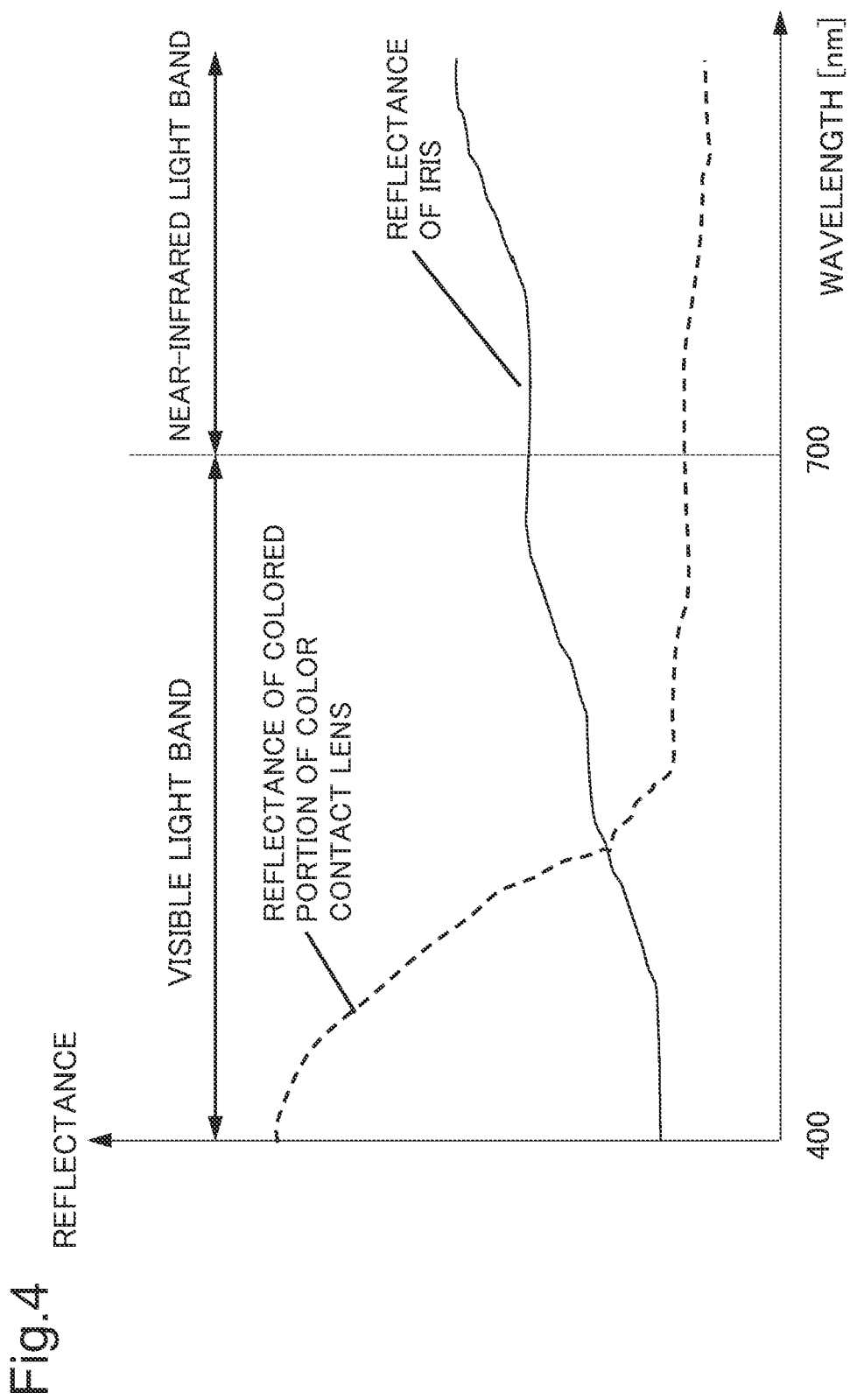
FIG. 4 is a graph illustrating an example of a change in reflectance at wavelengths in an iris and a colored portion of a color contact lens.

FIG. 4 is an example of a change in reflectance at wavelengths in the iris and the colored portion of the color contact lens.

As illustrated in FIG. 4, the iris maintains a certain degree of reflectance not only in the visible light band but also in the near-infrared light band. For example, as a light source for iris authentication, a light source in the near-infrared light band having a reflectance higher than the visible light band is often used.

The colored portion of the color contact lens has a high reflectance in a specific range of the visible light band in order to implement a predetermined color (for example, blue) in the visible light band. Meanwhile, the colored portion of the color contact lens absorbs or transmits light in a band (for example, from green to near-infrared light) other than the color desired to implement in order to avoid reflection in the band other than the color desired to implement. For example, the reflectance in the colored portion of the color contact lens illustrated in FIG. 4 is low in the visible light close to the near-infrared light band and the near-infrared light band. That is, in the colored portion of the color contact lens, light having a wavelength with high reflectance in the colored portion of the color contact lens is dominant.

Therefore, the presence or absence of wearing the color contact lens can be determined by comparing the reflectance in a plurality of wavelength bands. This finding has been newly found by the applicant.

The color contact lens is created not to reduce the transmittance at all the wavelengths as much as possible in portions other than the colored portion (in particular, the pupil and a portion near the pupil (for example, a pupil portion in FIG. 11)). This is to prevent inhibition of the visibility. Therefore, for example, even in the case where the color contact lens is worn, the reflectance of the iris other than the colored portion is substantially the reflectance of the iris itself.

Further, the light transmitted through the colored portion of the color contact lens is reflected by the iris. Therefore, the colored portion of the color contact lens may absorb the band (for example, from green to the near-infrared light) other than the color desired to implement. Note that the colored portion transmits light in the following description.

An image processing device according to each example embodiment described below determines the presence or absence of the color contact lens on the basis of the above findings. More specifically, the image processing device according to each of the example embodiments determines the presence or absence of wearing the color contact lens by using a feature amount of an image related to the reflectance in a plurality of wavelength bands of light.

In each example embodiment, the feature amount is not limited. For example, the feature amount may be a value obtained on the basis of a pixel value in an image. This is for the following reason.

The pixel value in the image is proportional to the amount of light received by a capture device or the like that generates the image. The amount of light received by the capture device or the like is proportional to the product of the amount of light of an illumination and the reflectance.

The amount of reflected light at each wavelength in the case of using the illumination depends on the intensity (spectral power) of each wavelength in the illumination. Alternatively, in a case of using a plurality of illuminations to capture images in a plurality of wavelength bands, the amount of light differs for each illumination.

Note that the amount of reflected light at each wavelength band is proportional to the reflectance in a case where the illumination does not change.

An example will be given using the reflectance illustrated in FIG. 4.

In this case, the reflectance of the iris is lower than the reflectance of the colored portion of the color contact lens in the wavelength band near 400 nm. Therefore, the pixel value of the image of the iris itself is smaller than the pixel value of the image of the iris when wearing the color contact lens in the wavelength band near 400 nm.

Meanwhile, the reflectance of the iris is higher than the reflectance of the colored portion of the color contact lens in the wavelength band exceeding 700 nm. That is, the influence of the colored portion of the color contact lens on the reflected light of the iris is small. Therefore, the pixel value of the image of the iris in the presence or absence of the color contact lens less changes in the wavelength band exceeding 700 nm than in the wavelength band near 400 nm.

That is, in the wavelength band near 400 nm, the pixel value of the image of the iris is easily affected by the presence or absence of the color contact lens. For example, in the case of FIG. 4, near 400 nm, the pixel value of the image of the iris in the colored portion of the color contact lens when the color contact lens is worn is considerably higher than the pixel value of the iris itself.

Meanwhile, in the wavelength band exceeding 700 nm, the pixel value of the image of the iris is less easily affected by the presence or absence of the color contact lens. For example, in the case of FIG. 4, near 700 nm, the pixel value of the image of the iris less changes between the case of wearing the color contact lens and the case of not wearing the color contact lens.

Therefore, a ratio of the pixel value in the image in the wavelength band exceeding 700 nm to the pixel value in the image in the wavelength band near 400 nm in the iris is larger than a similar ratio in the case of the iris when wearing the color contact lens.

This relationship does not change even when the illumination is different unless an illumination (for example, a black light or sodium lamp) having intensity biased to a specific wavelength region is used.

Therefore, in the following description, each example embodiment uses the pixel value in the image as the feature amount of the image related to the reflectance.

Further, the following description will be given using the near-infrared light band and the visible light band as examples of the light band. However, this is examples and does not limit each example embodiment. For example, each example embodiment may use a plurality of visible light bands or a plurality of near-infrared light bands. Moreover, each example embodiment may use more than two bands (for example, three visible light bands, two visible light bands and near-infrared light bands, or three visible light bands and near-infrared light bands).

In the following description, an iris is used as a target portion used for biometrics authentication. Further, a color contact lens is used as an object (covering object) covering the iris.

However, each example embodiment is not limited to the above. For example, the covering object is not limited to a color contact lens that directly contacts an eyeball (for example, a cornea). For example, the covering object may be a non-contact material such as sunglasses. Further, the portion used for biometrics authentication is not limited to the iris. For example, the portion used for biometrics authentication may be a face. As the covering object in the face authentication, for example, glasses or cosmetics are assumed.

First Example Embodiment

Hereinafter, an image processing device 300 according to a first example embodiment will be described with reference to the drawings.

[Related System]

To facilitate understanding of the image processing device 300 according to the first example embodiment, first, an authentication system 100 using the image processing device 300 will be described. The authentication system 100 is an example of a system using the image processing device 300.

Figure 3:
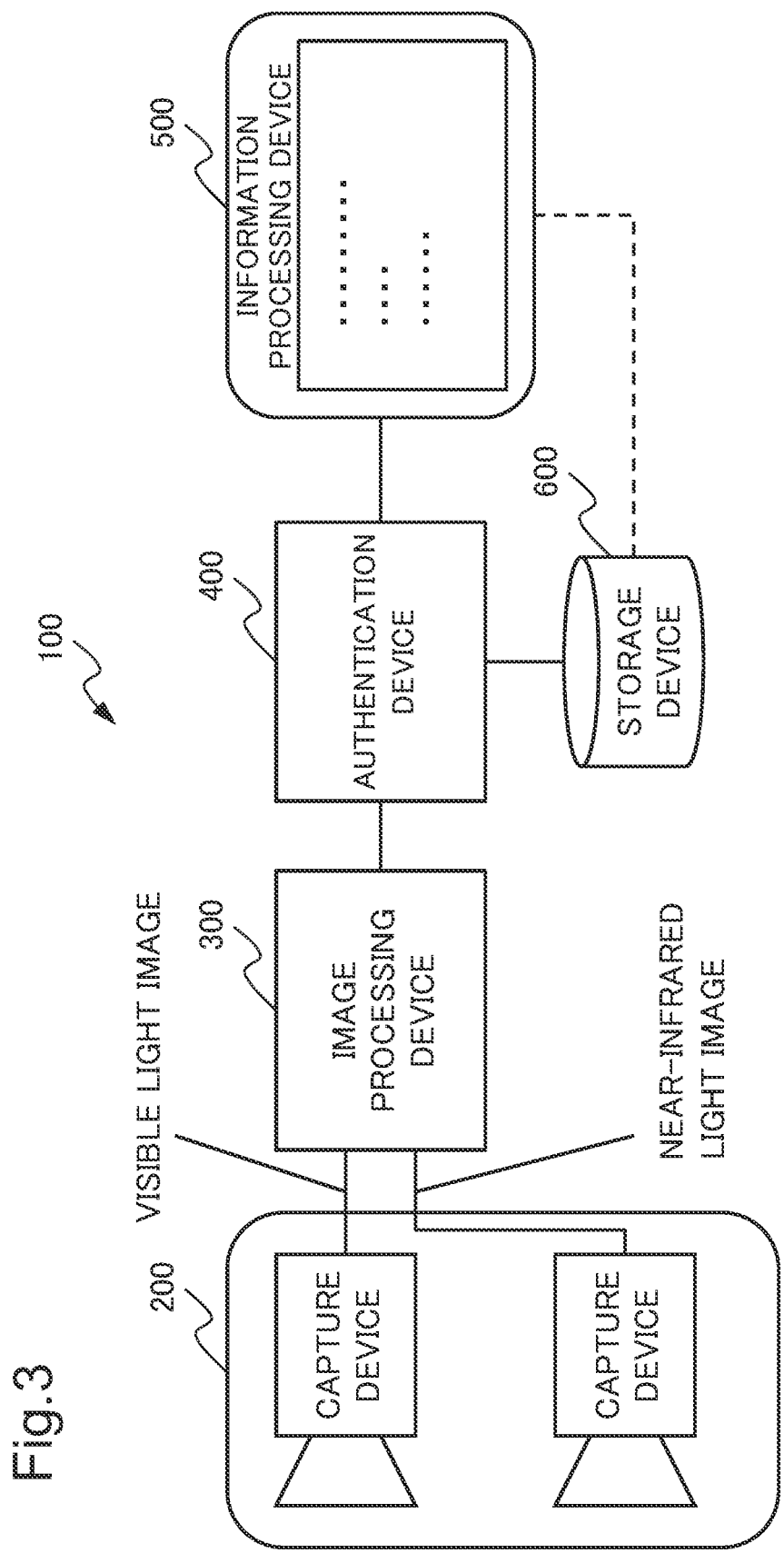
FIG. 3 is a block diagram illustrating an example of an authentication system according to the first example embodiment.

FIG. 3 is a block diagram illustrating an example of the authentication system 100 according to the first example embodiment.

The authentication system 100 includes a capture device 200, the image processing device 300, an authentication device 400, an information processing device 500, and a storage device 600.

The capture device 200 captures a portion (for example, the face, an eye, or an iris) used for biometrics authentication, and acquires an image (for example, a face image, an eye image, or an iris image) corresponding to the captured portion. As will be described in detail below, the image processing device 300 processes images in a plurality of wavelength bands. Therefore, the capture device 200 acquires images respectively corresponding to the plurality of wavelength bands. The authentication system 100 illustrated in FIG. 3 acquires the images respectively corresponding to the plurality of wavelength bands using a plurality of the capture devices 200.

Note that the configuration of the capture device 200 is not limited to the above description. One capture device 200 may acquire the images corresponding to the plurality of wavelength bands.

Figure 5:
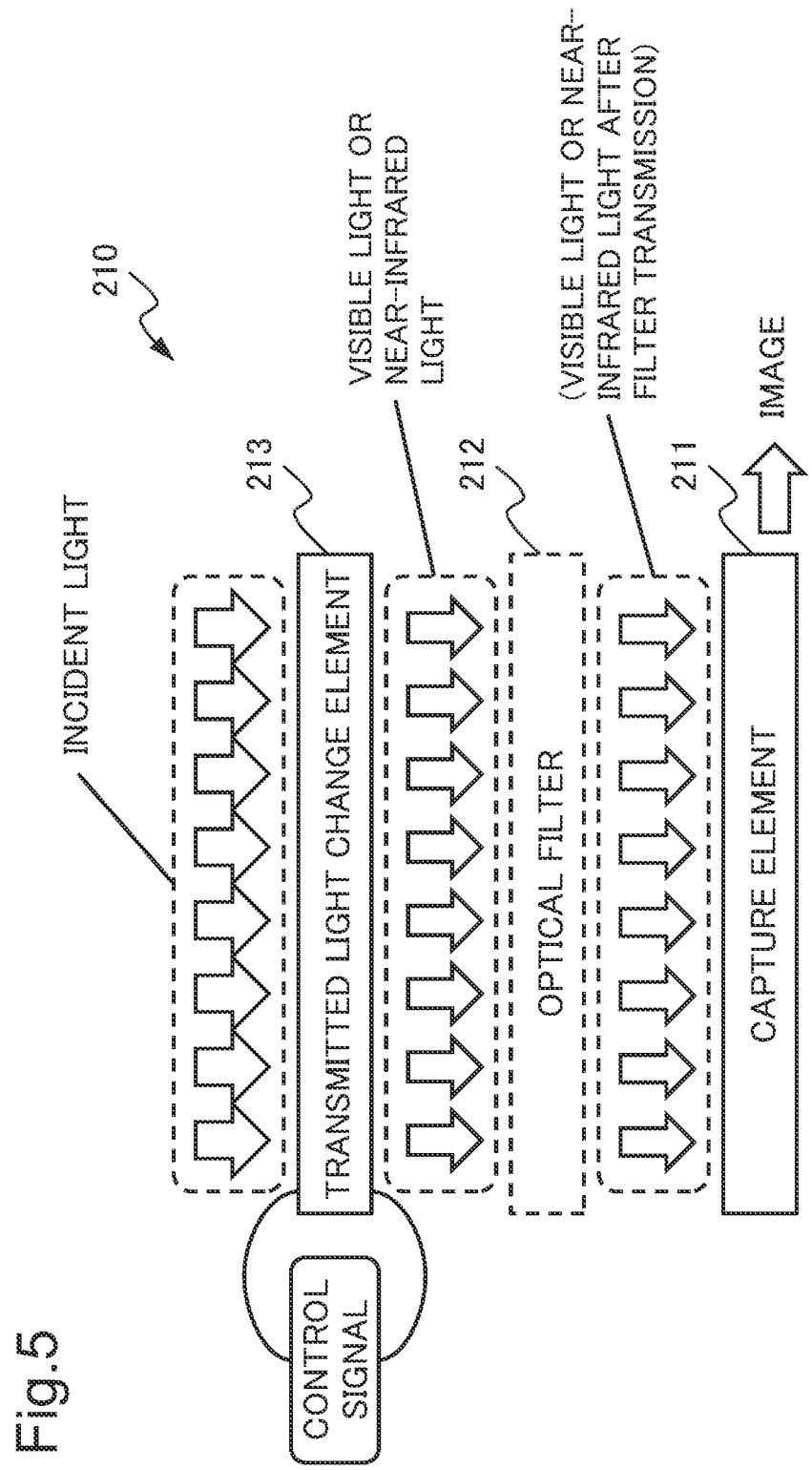
FIG. 5 is a diagram illustrating an example of an outline of a configuration of a capture device related to a plurality of wavelength bands.

FIG. 5 is a diagram illustrating an example of an outline of a configuration of the capture device 210 related to a plurality of wavelength bands. The capture device 210 includes a capture element 211 and a transmitted light change element 213.

The capture element 211 receives light transmitted through the transmitted light change element 213 and outputs an image. The capture element 211 is, for example, a charge coupled device (CCD) or a complementary metal oxide semiconductor (CMOS) image sensor.

The transmitted light change element 213 is an element that changes the wavelength band of the transmitted light (transmitted light) on the basis of a control signal. In other words, the transmitted light change element 213 is an element that selects light in a predetermined wavelength band from incident light on the basis of the control signal.

For example, there is a thin film that changes a wavelength band to transmit according to an applied voltage. Therefore, in the capture device 210, a thin film is installed as the transmitted light change element 213 between an optical component such as an objective lens (not illustrated) and the capture element 211. Then, a control unit (not illustrated) of the capture device 210 controls the voltage to be applied to the thin film. For example, the control unit of the capture device 210 switches the voltage to be applied to the thin film to change the light transmitted through the thin film into the near-infrared light band and the visible light band. In this case, the applied voltage is an example of the control signal for controlling the thin film (transmitted light change element 213).

Note that the transmitted light change element 213 is not limited to the thin film. For example, the transmitted light change element 213 may include a plurality of optical filters respectively corresponding to a plurality of bands, and switch the optical filters on the basis of the control signal.

The capture device 210 may provide a predetermined optical filter 212 between the transmitted light change element 213 and the capture element 211 in accordance with the specification of the capture element 211.

The capture device 210 implements a function similar to the plurality of capture devices 200 using the transmitted light change element 213. In the case of using the capture device 210, the authentication system 100 may include one capture device 210.

Figure 6:
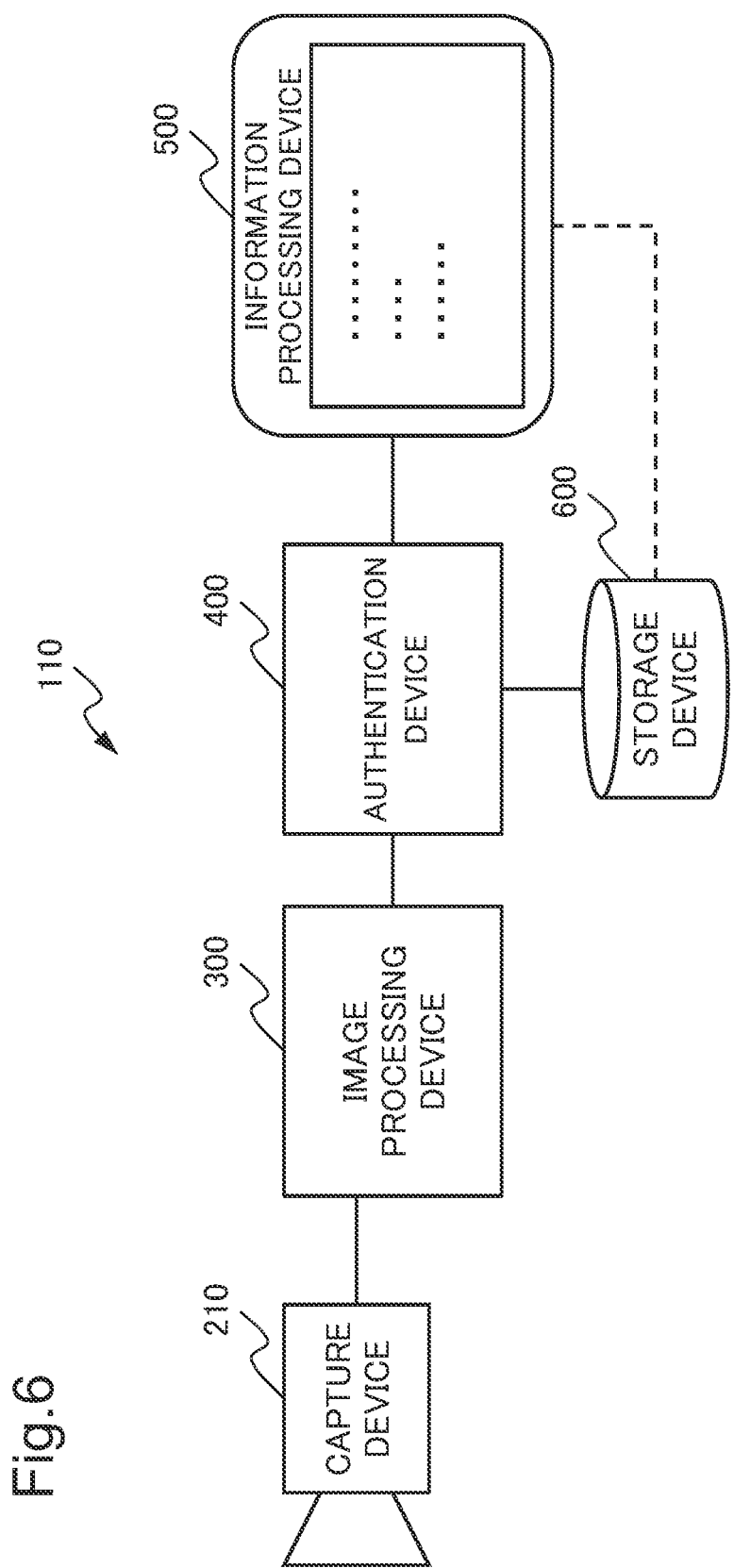
FIG. 6 is a diagram illustrating an example of a configuration of an authentication system including the capture device illustrated in FIG. 5.

FIG. 6 is a diagram illustrating an example of the configuration of the authentication system 110 including the capture device 210 illustrated in FIG. 5.

The capture device 210 operates similarly to the capture device 200 except that the one capture device captures images in a plurality of wavelength bands. Therefore, the capture device 200 includes the capture device 210 in the following description unless otherwise specified. Similarly, the authentication system 100 includes an authentication system 110 in the following description unless otherwise specified.

Description returns to the description with reference to FIG. 3.

The image processing device 300 processes the image received from the capture device 200 (for example, an image of the face or an eye including an iris), and creates data used for authentication by the authentication device 400 (for example, an iris image for authentication). For example, in the case of receiving the image of the face or an eye, the image processing device 300 creates an image obtained by cutting out an iris portion (iris image) in the image. At that time, the image processing device 300 may execute image processing that facilitates processing in the authentication device 400. The image processing is, for example, adjustment of a pixel value (adjustment of brightness, contrast, hue, and/or the like), image shaping (rotation, enlargement, reduction, deformation, and/or the like), and/or noise removal.

The authentication device 400 executes biometrics authentication using the image received from the image processing device 300 and the data stored in the storage device 600. For example, the authentication device 400 stores the iris image of a person to be authenticated in the storage device 600 in advance. Then, the authentication device 400 authenticates the person captured by the capture device 200 using the iris image received from the image processing device 300 and the stored iris image.

The storage device 600 records information (for example, the iris image for comparison or a feature vector of the iris image for comparison) used for the authentication by the authentication device 400.

The information processing device 500 executes predetermined processing on the basis of an authentication result of the authentication device 400.

For example, in a case where the information processing device 500 manages entry to a building, the information processing device 500 controls opening and closing of a door of an entrance of the building on the basis of the authentication result.

Alternatively, the information processing device 500 may display information regarding the person captured by the capture device 200 on the basis of the authentication result of the authentication device 400. For example, the information processing device 500 may display information such as a name and an attribute (for example, a department to which the person belongs or information regarding a person (for example, a warning to a marked person)) of the person captured by the capture device 200.

The storage device 600 may store the information used by the information processing device 500. In this case, the information processing device 500 may acquire necessary information from the storage device 600. FIG. 3 illustrates connection between the information processing device 500 and the storage device 600 in such a case, using a broken line.

Alternatively, the information processing device 500 may present the authentication result to the person captured by the capture device 200. For example, in a case where the authentication device 400 cannot make authentication, the information processing device 500 may notify the person captured by the capture device 200 of a request for re-authentication.

FIG. 3 illustrates, as an example, a case where the information processing device 500 displays a message.

In this manner, the image processing device 300 processes the image used for authentication in the authentication system 100.

Some or all of the devices included in the authentication system 100 may be implemented as one physical device. For example, a computer such as a server may implement the functions of the image processing device 300, the authentication device 400, and the information processing device 500.

[Description of Configuration]

Next, a configuration of the image processing device 300 according to the first example embodiment will be described with reference to the drawings.

The image processing device 300 acquires an image from a device corresponding to the capture device 200, creates an image necessary for authentication for a device corresponding to the authentication device 400 or the like, and outputs the image. Moreover, the image processing device 300 determines whether a covering object (for example, a color contact lens) is worn on a portion to be authenticated (for example, a portion used for iris authentication) in the acquired image.

The image processing device 300 is only required to execute processing similar to image processing generally performed in image creation. Therefore, in the following description, for convenience of description, description of configurations and operations used for general image processing is omitted, and configurations and operations specific to the present example embodiment will be mainly described.

FIG. 1 is a block diagram illustrating an example of a configuration of the image processing device 300 according to the first example embodiment.

The image processing device 300 includes a visible light band feature amount calculation unit 310, a near-infrared light band feature amount calculation unit 320, a color contact lens determination unit 330, and a storage unit 340.

The visible light band feature amount calculation unit 310 receives an image in a visible light band (first wavelength band) from the capture device 200. Then, the visible light band feature amount calculation unit 310 calculates a feature amount (first feature amount) in the visible light band on the basis of the image in the visible light band.

In the first example embodiment, the feature amount is not limited. For example, in the case where the authentication is the iris authentication, the feature amount may be an average value of pixel values in the image of the iris portion. Alternatively, the feature amount may be a degree of variation in pixel values (for example, a variance, a standard deviation, or a difference between a maximum value and a minimum value). In the following description, the average value of pixel values is used as an example of the feature amount including the near-infrared light band.

The band of light used for a visible light image does not necessarily include all the visible light bands. The visible light image may be an image in a band of specific light (for example, red, green, or blue) in the visible light band.

A pixel of the image includes, as a pixel value, a luminance value related to a color. Therefore, for example, in a case where a pixel includes three pixel values of red, green, and blue (Red, Green, and Blue) as the pixel values, the visible light band feature amount calculation unit 310 may use the pixel value of any one color (red, green, or blue) as the pixel value of the visible light image. Alternatively, the visible light band feature amount calculation unit 310 may use the pixel values of any two colors (red and green, green and blue, or blue and red).

Moreover, the visible light band feature amount calculation unit 310 may use a weight in calculation of the feature amount. For example, the visible light band feature amount calculation unit 310 may set a weight for each pixel value of a band of a plurality of colors (for example, red, green, and blue) and calculate an average value. The weight is represented by a numerical value.

For example, in a case where a color of reflected light of a wearing portion of the color contact lens is assumed, the visible light band feature amount calculation unit 310 may make the weight for the pixel value related to the color of the reflected light large. More specifically, for example, in a case where wearing of a blue color contact lens is assumed, the visible light band feature amount calculation unit 310 may make the weight for the blue pixel value larger than the weight for the red pixel value and the weight for the green pixel value.

The near-infrared light band feature amount calculation unit 320 receives an image in the near-infrared light band (second wavelength band) from the capture device 200. Then, the near-infrared light band feature amount calculation unit 320 calculates a feature amount (second feature amount) in the near-infrared light band on the basis of the image in the near-infrared light band.

Similarly to the visible light band feature amount calculation unit 310, the near-infrared light band feature amount calculation unit 320 may use a portion of band within the near-infrared light band.

The visible light band feature amount calculation unit 310 and the near-infrared light band feature amount calculation unit 320 may calculate the feature amount using a weight related to a position of a pixel. The weight is represented by a numerical value.

For example, in the iris authentication, in general, the iris at a position close to the pupil has higher authentication accuracy than the iris at a position away from the pupil (a position close to a sclera (white eye)).

Moreover, the color contact lens is not colored in the pupil and near the pupil. Alternatively, the color contact lens is less colored in the pupil and near the pupil. This is because the color contact lens does not change the light reaching a retina of the eye through the pupil.

Therefore, the visible light band feature amount calculation unit 310 and the near-infrared light band feature amount calculation unit 320 may set a large weight to a pixel near the pupil and set a small weight to a pixel at a position distant from the pupil.

The visible light band feature amount calculation unit 310 and the near-infrared light band feature amount calculation unit 320 may use different weights from each other.

Alternatively, the image used for calculation of the feature amount by the visible light band feature amount calculation unit 310 may be different in part of attributes other than the wavelength band from the image used for calculation of the feature amount by the near-infrared light band feature amount calculation unit 320. For example, the visible light band feature amount calculation unit 310 may use the image different in any one or all of the size, shape, capture range, and resolution from the image used by the near-infrared light band feature amount calculation unit 320.

Alternatively, the visible light band feature amount calculation unit 310 and the near-infrared light band feature amount calculation unit 320 may use an image that does not include a part of a portion to be authenticated (for example, the iris) and/or includes another portion.

Figure 7:
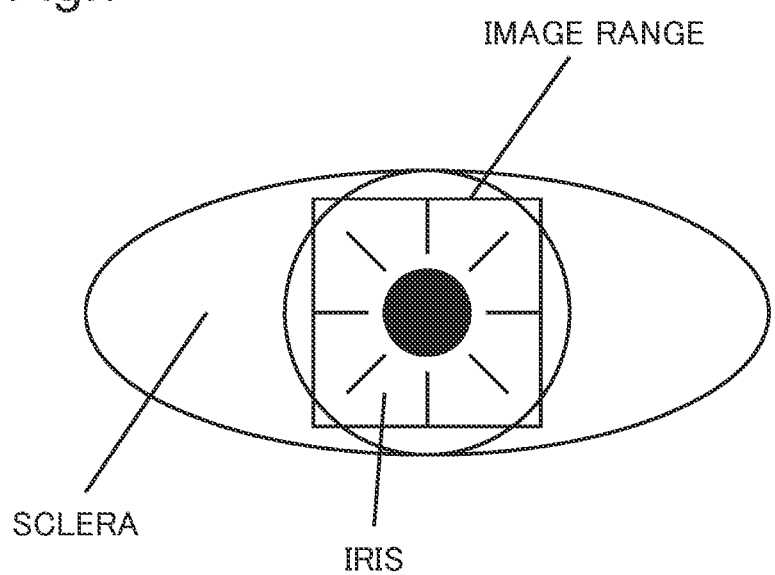
FIG. 7 is a diagram illustrating an example of a relationship between an iris and an image.

FIG. 7 is a diagram illustrating an example of a relationship between an iris and an image. In FIG. 7, a rectangular portion is a range used as the image. The rectangle illustrated in FIG. 7 includes a part of the iris and a part of the sclera (white eye). The visible light band feature amount calculation unit 310 and the near-infrared light band feature amount calculation unit 320 may use the image in the image range illustrated in FIG. 7 in the iris authentication.

Description returns to the description with reference to FIG. 1.

The color contact lens determination unit 330 determines whether the color contact lens is worn on the basis of the feature amount in the visible light band (first feature amount) and the feature amount in the near-infrared light band (second feature amount). The determination method in the color contact lens determination unit 330 may be determined in accordance with characteristics of the color contact lens and is not limited.

Hereinafter, an example of the determination in the color contact lens determination unit 330 will be described.

Referring to FIG. 4, the reflectance of the iris has a smaller change corresponding to the wavelength than the reflectance of the colored portion of the color contact lens. Meanwhile, since the iris when wearing the color contact lens is affected by the colored portion of the color contact lens, the reflectance on a short wavelength side that is the visible light band is larger than the reflectance on a long wavelength side that is the near-infrared light band.

Therefore, the color contact lens determination unit 330 obtains a ratio between the average value of the pixel values of a visible light image and the average value of the pixel values of a near-infrared light image as described below.

The ratio=a coefficient×the average value of the pixel values of the near-infrared light image/the average value of the pixel values of the visible light image.

The coefficient is used to set a ratio value to a value that is easy to use for determination. An example of the coefficient is a coefficient (normalization coefficient) for normalizing the ratio to be 1 in the case of not wearing the color contact lens, that is, in the case of the iris in a naked eye state. Note that the value of the coefficient may be calculated in advance using a plurality of sets of the iris image of wearing the color contact lens and the iris image of the naked eye.

The above ratio is smaller in the case of wearing the color contact lens than in the case of not wearing the color contact lens. For example, assuming a case where the coefficient is "1", and the average value of the pixel values of the near-infrared light image and the average value of the pixel values of the visible light image are the average of the reflectance of the near-infrared light band and the average value of the reflectance of the visible light band illustrated in FIG. 4, the ratio becomes as follows.

In the case of the iris: the ratio>1

In case of the iris when wearing the color contact lens: the ratio<1

Therefore, the color contact lens determination unit 330 calculates the above ratio, and determines whether the color contact lens is worn on the basis of whether the calculated ratio is larger than a preset threshold ("1" in the above case). The threshold used by the color contact lens determination unit 330 may be set on the basis of actual measurement using the color contact lens to be determined.

The color contact lens determination unit 330 may correct the above ratio. For example, the color contact lens determination unit 330 may modify the average values used for the ratio by using a characteristic (for example, a spectral characteristic) at the wavelength of the iris actually measured in advance and a characteristic (for example, a spectral characteristic) at the wavelength of the iris when wearing the color contact lens.

Alternatively, the color contact lens determination unit 330 may change the determination on the basis of another information (for example, time). For example, a wavelength distribution of illumination light may change between daytime and nighttime. Therefore, the color contact lens determination unit 330 may modify the threshold on the basis of environmental conditions such as daytime and nighttime.

Note that the average value of the pixel values of the visible light image is an example of the first feature amount. Furthermore, the average value of the pixel values of the near-infrared light image is an example of the second feature amount. That is, the color contact lens determination unit 330 determines the presence or absence of the color contact lens (an example of the covering object) in the iris image (an example of the portion to be authenticated) on the basis of the first feature amount and the second feature amount.

The storage unit 340 stores information (determination information) used for determination by the color contact lens determination unit 330, such as the above-described threshold.

The determination information is not limited to the above threshold. For example, capture includes an error. Furthermore, an error range assumed in capture changes according to a capture condition. Therefore, the determination information may be, for example, information that associates the ratio with a probability of wearing the color contact lens corresponding to each of a plurality of capture conditions. For example, the storage unit 340 may store a list of probabilities related to ratios corresponding to the plurality of capture conditions (for example, weather). In this case, the color contact lens determination unit 330 may acquire the capture condition of the iris, obtain the probability associated with the capture condition and the ratio, and determine whether the color contact lens is worn on the basis of the probability and the threshold.

The color contact lens determination unit 330 is not limited to the above and may obtain a probability related to another information. For example, the color contact lens determination unit 330 acquires an image including a portion not affected by the color contact lens (for example, a scleral portion) as the image for determination. Then, the color contact lens determination unit 330 determines the capture condition of an image by using a pixel value of the portion not affected by the color contact lens (for example, the scleral portion). Then, the color contact lens determination unit 330 may obtain the probability on the basis of the ratio and the capture condition.

The color contact lens determination unit 330 may receive determination information such as the threshold from an external device (not illustrated). Alternatively, the color contact lens determination unit 330 may store the determination information. In this case, the image processing device 300 need not include the storage unit 340.

As an example of the operation not using the storage unit 340, the following operation can be assumed. As an initial state, the color contact lens determination unit 330 makes a determination using the threshold received from an external device. Then, in a trial period, a user of the authentication system 100 checks a change in the determination result while transmitting the threshold to the image processing device 300 using an operation device (not illustrated) or the like. Using such an operation, the user determines the threshold when an appropriate determination result is obtained. Then, the user sets the determined threshold in the color contact lens determination unit 330 as the threshold to be used at the time of actual operation. Thereafter, the color contact lens determination unit 330 may operate using the set threshold.

In the case where the image processing device 300 includes the storage unit 340, the storage unit 340 may store a threshold determined on the basis of an operation similar to the above operation.

The image processing device 300 may operate using an image captured in advance. In this case, the image processing device 300 only needs to receive the image not from the capture device 200 but from a device that stores the image.

[Description of Operation]

Next, an operation of the image processing device 300 according to the first example embodiment will be described with reference to the drawings.

Figure 2:
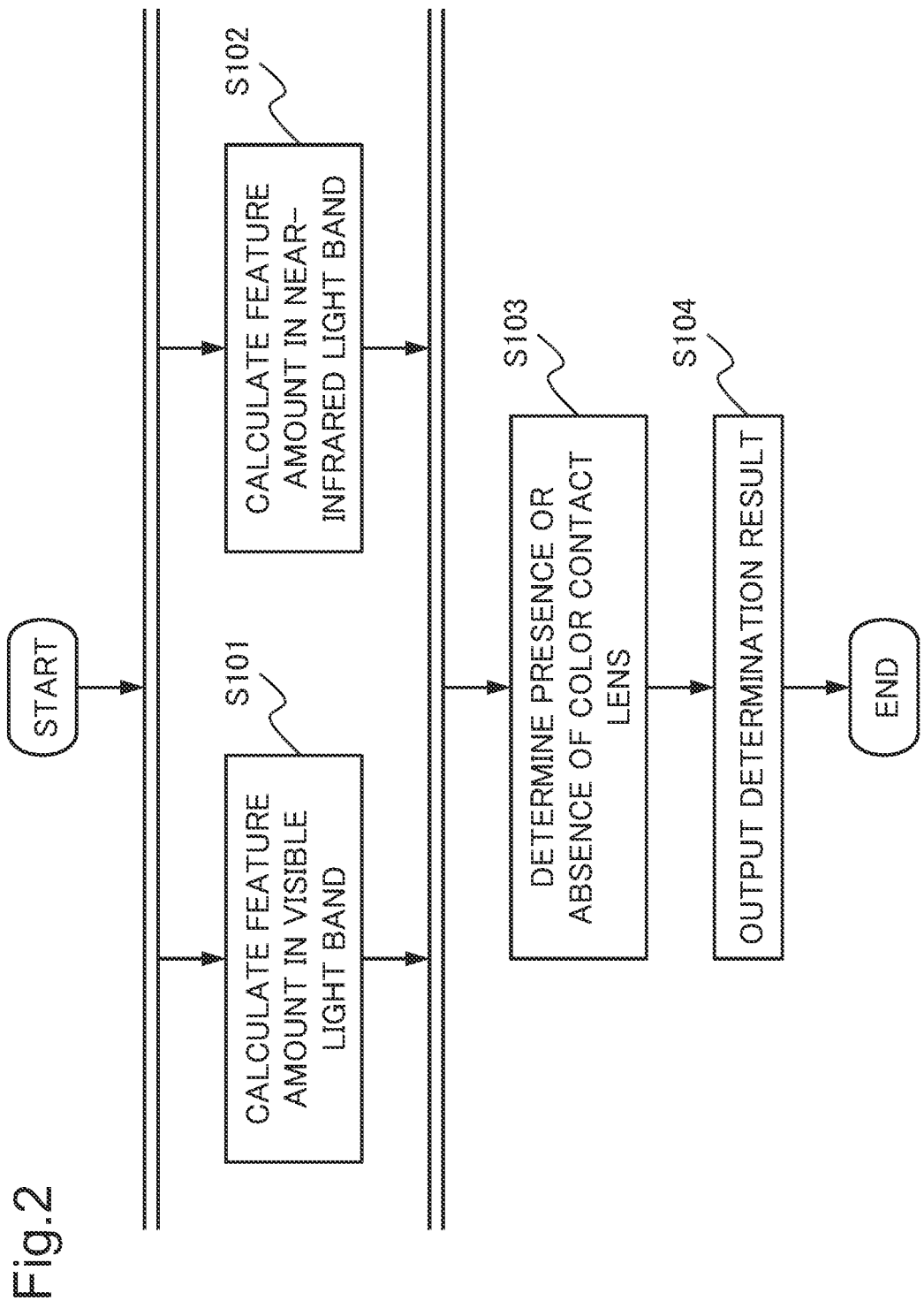
FIG. 2 is a flowchart illustrating an example of an operation of the image processing device according to the first example embodiment.

FIG. 2 is a flowchart illustrating an example of an operation of the image processing device 300 according to the first example embodiment.

The visible light band feature amount calculation unit 310 calculates the feature amount (first feature amount) of the visible light band using the image in the visible light band (first wavelength band) (step S101).

The near-infrared light band feature amount calculation unit 320 calculates the feature amount (second feature amount) in the near-infrared light band using the image in the near-infrared light band (second wavelength band) (step S102).

The image processing device 300 may switch the order of the operations in step S101 and step S102. Alternatively, the image processing device 300 may operate at least a part of step S101 and step S102 in parallel.

The color contact lens determination unit 330 determines the presence or absence of the color contact lens (covering object) in the iris portion (target portion) on the basis of the feature amount (first feature amount) in the visible light band and the feature amount (second feature amount) in the near-infrared light band (step S103).

The color contact lens determination unit 330 outputs the determination result to the authentication device 400 (step S104).

The authentication device 400 executes an operation related to authentication by using the determination result.

For example, when receiving the determination result that the color contact lens is not worn, the authentication device 400 executes normal iris authentication.

Meanwhile, when receiving the determination result that the color contact lens is worn, the authentication device 400 executes an operation related to wearing the color contact lens.

For example, the authentication device 400 may execute an operation similar to a case of failure in the iris authentication. For example, the authentication device 400 requests the person to be authenticated to perform re-authentication. More specifically, for example, the authentication device 400 may request the person to be authenticated to perform re-authentication by removing the color contact lens. Alternatively, the authentication device 400 may notify a predetermined notification destination of the authentication failure based on wearing the color contact lens.

The image processing device 300 may execute an operation related to the operation of the authentication device 400 described above. For example, the image processing device 300 may request the person to be authenticated to perform re-authentication.

Alternatively, the authentication device 400 may execute authentication related to wearing the color contact lens. The color contact lens is not colored near the pupil. Therefore, in the case where the color contact lens is worn, the authentication device 400 may perform authentication using an image of the iris near the pupil. Alternatively, in the case where the color contact lens is worn, the authentication device 400 may increase the weight of the pixel near the pupil and decrease the weight of the pixel at the position away from the pupil in the weights of the pixels used for authentication. Moreover, to reduce the pupil, the authentication device 400 may reduce the amount of light in the visible light band in an environment such as illumination.

[Description of Effects]

Next, effects of the image processing device 300 according to the first example embodiment will be described.

The image processing device 300 according to the first example embodiment can obtain an effect of determining the presence or absence of wearing the covering object (for example, the color contact lens) on the target portion (for example, the iris) used for authentication.

The reason is as follows.

The image processing device 300 includes the visible light band feature amount calculation unit 310, the near-infrared light band feature amount calculation unit 320, and the color contact lens determination unit 330. The visible light band feature amount calculation unit 310 calculates the first feature amount in the visible light band (first wavelength band) using the image in the visible light band (first wavelength band) in the iris (target portion) used for authentication of a person. The near-infrared light band feature amount calculation unit 320 calculates the second feature amount in the near-infrared light band (second wavelength band) using the image of the near-infrared light band (second wavelength band) in the iris (target portion). The color contact lens determination unit 330 determines the presence or absence of the color contact lens (covering object) in the iris (target portion) on the basis of the first feature amount and the second feature amount.

As illustrated in FIG. 4, the reflectance ratio between the visible light band and the near-infrared light band of the iris is different from the reflectance ratio between the visible light band and the near-infrared light band of the iris when wearing the color contact lens. That is, the ratio between the pixel value of the image in the visible light band and the pixel value of the image in the near-infrared light band in the iris is different from the ratio between the pixel value of the image in the visible light band and the pixel value of the image in the near-infrared light band in the iris when wearing the color contact lens.

Therefore, the image processing device 300 can determine the presence or absence of the color contact lens in the iris on the basis of the feature amount (first feature amount) of the pixel value of the image in the visible light band (first wavelength band) and the feature amount (second feature amount) of the pixel value of the image in the near-infrared light band (second wavelength band) using the above configuration.

[Outline of Example Embodiment]

An outline of the image processing device 300 according to the first example embodiment will be described with reference to the drawings.

Figure 8:
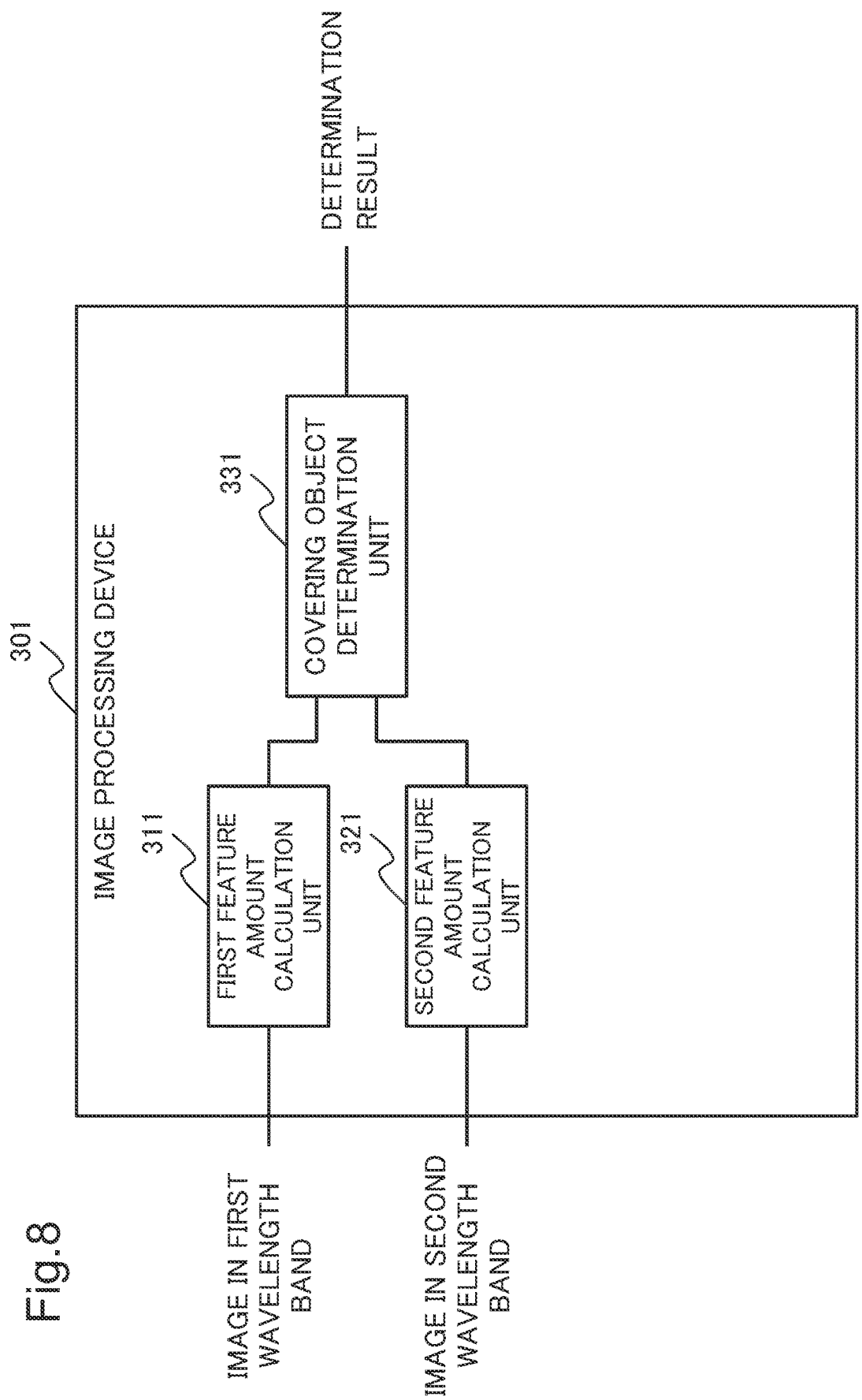
FIG. 8 is a block diagram illustrating an example of an outline of the image processing device according to the first example embodiment.

FIG. 8 is a block diagram illustrating a configuration of an image processing device 301 as an example of the outline of the image processing device 300 according to the first example embodiment.

The image processing device 301 includes a first feature amount calculation unit 311, a second feature amount calculation unit 321, and a covering object determination unit 331. The first feature amount calculation unit 311 calculates the first feature amount in the first wavelength band using the image in the first wavelength band in the iris used for authentication of a person. The second feature amount calculation unit 321 calculates the second feature amount in the second wavelength band using the image in the second wavelength band in the iris. The covering object determination unit 331 determines the presence or absence of the color contact lens on the iris on the basis of the first feature amount and the second feature amount.

The visible light band feature amount calculation unit 310 is an example of the first feature amount calculation unit 311. The near-infrared light band feature amount calculation unit 320 is an example of the second feature amount calculation unit 321. The color contact lens determination unit 330 is an example of the covering object determination unit 331.

Each configuration of the image processing device 301 operates similarly to the related configuration in the image processing device 300.

The image processing device 301 configured as described above can obtain effects similar to the image processing device 300.

This is because each configuration of the image processing device 301 operates similarly to the related configuration in the image processing device 300.

The image processing device 301 has the minimum configuration in the first example embodiment.

[Hardware Configuration]

Next, a hardware configuration of the image processing device 300 will be described.

Each component of the image processing device 300 may be configured by a hardware circuit.

Alternatively, in the image processing device 300, each component may be configured using a plurality of devices connected via a network.

Alternatively, in the image processing device 300, a plurality of components may be configured by one piece of hardware.

Alternatively, the image processing device 300 may be implemented as a computer including a central processing unit (CPU), a read only memory (ROM), and a random access memory (RAM). In addition to the above configuration, the image processing device 300 may be implemented as a computer further including an input and output connection circuit (IOC). In addition to the above configuration, the image processing device 300 may be implemented as a computer further including a network interface circuit (NIC).

Figure 9:
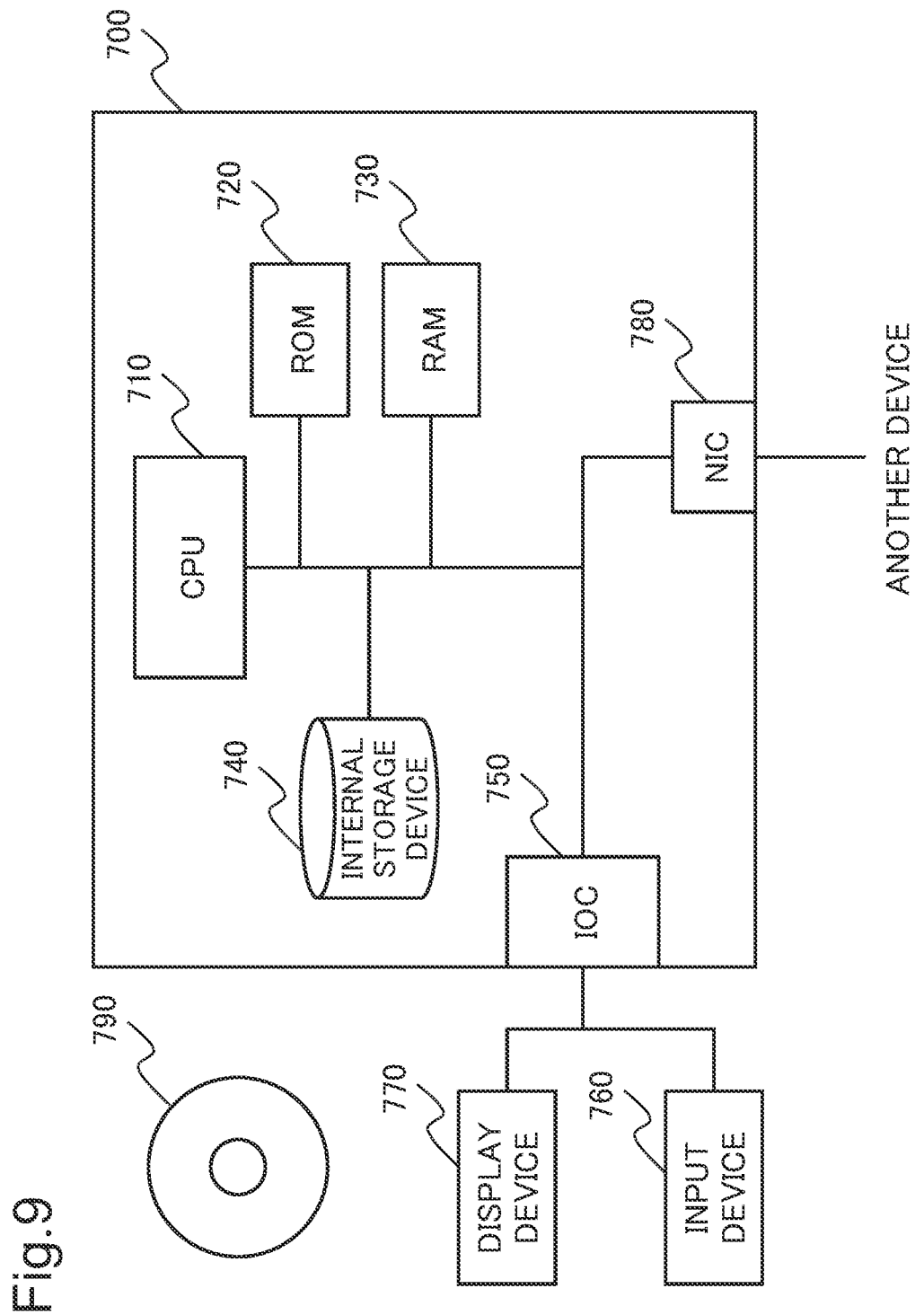
FIG. 9 is a block diagram illustrating an example of a hardware configuration of the image processing device according to the first example embodiment.

FIG. 9 is a block diagram illustrating a configuration of an information processing device 700 as an example of the hardware configuration of the image processing device 300 according to the first example embodiment.

The information processing device 700 includes a CPU 710, a ROM 720, a RAM 730, an internal storage device 740, an IOC 750, and an NIC 780 to constitute a computer.

The CPU 710 reads a program from the ROM 720 and/or the internal storage device 740. Then, the CPU 710 controls the RAM 730, the internal storage device 740, the IOC 750, and the NIC 780 on the basis of the read program. Then, the computer including the CPU 710 controls these configurations to implement functions as the visible light band feature amount calculation unit 310, the near-infrared light band feature amount calculation unit 320, and the color contact lens determination unit 330 illustrated in FIG. 1.

When implementing each function, the CPU 710 may use the RAM 730 or the internal storage device 740 as a temporary storage medium of the program.

In addition, the CPU 710 may read a program included in a recording medium 790 that stores the program in a computer readable manner, using a recording medium reading device (not illustrated). Alternatively, the CPU 710 may receive a program from an external device (not illustrated) via the NIC 780, store the program in the ROM 720, the RAM 730, or the internal storage device 740, and operate on the basis of the stored program.

The ROM 720 stores the program executed by the CPU 710 and fixed data. The ROM 720 is, for example, a programmable ROM (P-ROM) or a flash ROM.

The RAM 730 temporarily stores the program executed by the CPU 710 and data. The RAM 730 is, for example, a dynamic-RAM (D-RAM).

The internal storage device 740 stores data and programs stored for a long period of time by the information processing device 700. The internal storage device 740 implements a function as the storage unit 340. The internal storage device 740 may operate as a temporary storage device of the CPU 710. The internal storage device 740 is, for example, a hard disk device, a magneto-optical disk device, a solid state drive (SSD), or a disk array device.

The ROM 720 and the internal storage device 740 are non-volatile (non-transitory) recording media. Meanwhile, the RAM 730 is a volatile (transitory) recording medium. Then, the CPU 710 is operable on the basis of the program stored in the ROM 720, the internal storage device 740, or the RAM 730. That is, the CPU 710 is operable using a non-volatile recording medium or a volatile recording medium.

The IOC 750 mediates data between the CPU 710 and an input device 760 and between the CPU 710 and a display device 770. The IOC 750 is, for example, an IO interface card or a universal serial bus (USB) card. Furthermore, the IOC 750 is not limited to wired communication such as USB, and may be wireless communication.

The input device 760 is a device that receives an input instruction from an operator of the information processing device 700. The input device 760 is, for example, a keyboard, a mouse, or a touch panel. The input device 760 may include a camera or the like and operate as the capture device 200.

The display device 770 is a device that displays information to the operator of the information processing device 700. The display device 770 is, for example, a liquid crystal display, an organic electroluminescence display, or electronic paper.

The NIC 780 relays exchange of data with an external device (not illustrated) via a network. The NIC 780 mediates data between the capture device 200 and the image processing device 300 and between the authentication device 400 and the image processing device 300. The NIC 780 is, for example, a local area network (LAN) card. Furthermore, the NIC 780 is not limited to wired communication and may be wireless communication.

The information processing device 700 configured as described above can obtain effects similar to the image processing device 300.

This is because the CPU 710 of the information processing device 700 can implement functions similar to the image processing device 300 on the basis of the program.

[Outline of Authentication System]

Next, an outline of the authentication system 100 including the image processing device 300 according to the first example embodiment will be described.

Figure 10:
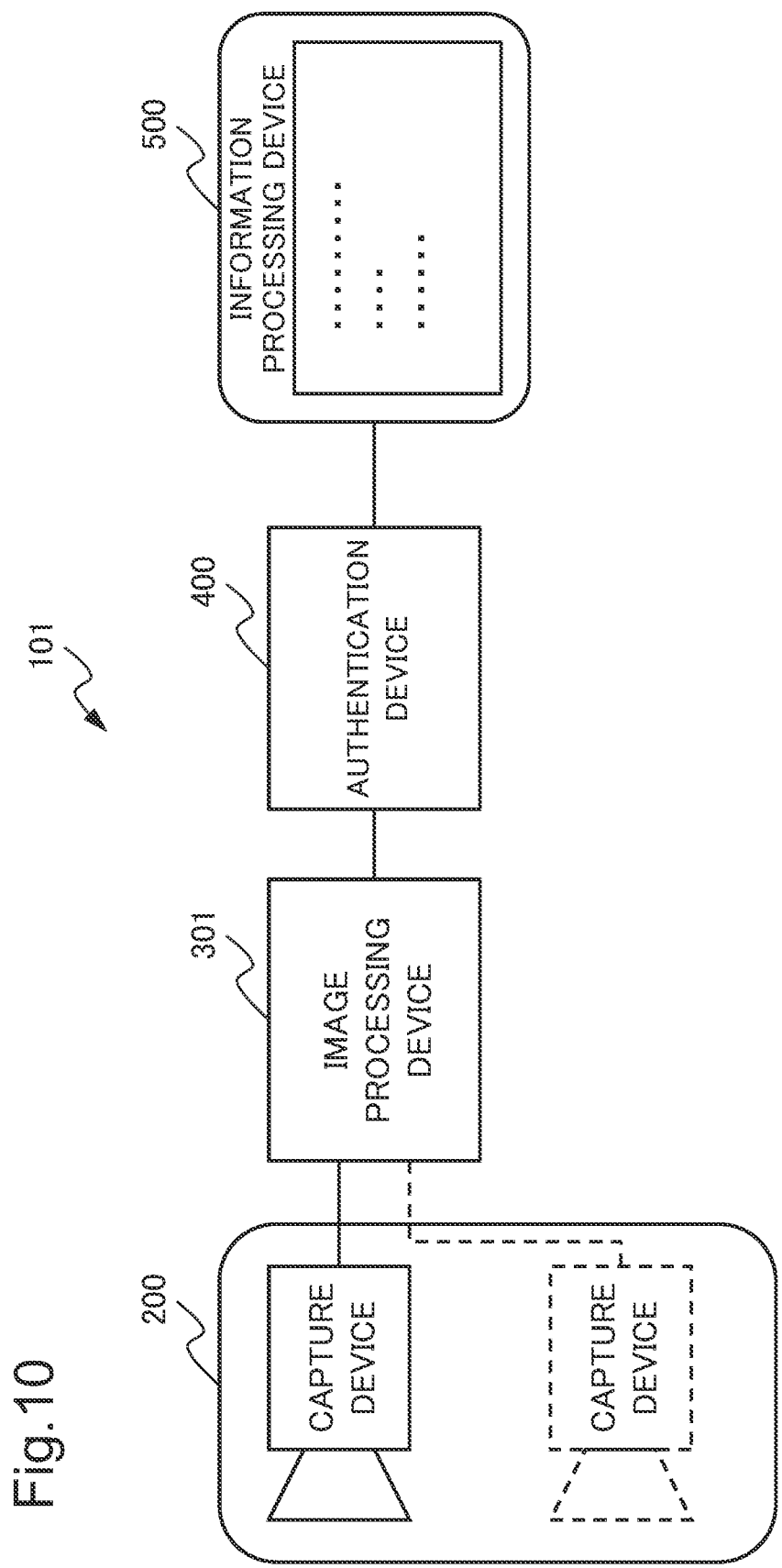
FIG. 10 is a block diagram illustrating a configuration of an example of an outline of the authentication system according to the first example embodiment.

FIG. 10 is a block diagram illustrating a configuration of an authentication system 101 as an example of the outline of the authentication system 100 according to the first example embodiment.

The authentication system 101 includes the capture device 200, the image processing device 301, the authentication device 400, and the information processing device 500. The capture device 200 captures an iris used for authentication of a person, using the first wavelength band (for example, the visible light band) and the second wavelength band (for example, the near-infrared light band). The authentication device 400 authenticates the person using the determination result of the presence or absence of the color contact lens in the iris. The information processing device 500 executes processing on the basis of the authentication result of the authentication device 400. The image processing device 301 includes the first feature amount calculation unit 311, the second feature amount calculation unit 321, and the covering object determination unit 331. The first feature amount calculation unit 311 calculates the first feature amount in the first wavelength band using the image in the first wavelength band. The second feature amount calculation unit 321 calculates the second feature amount in the second wavelength band using the image in the second wavelength band. The covering object determination unit 331 determines the presence or absence of the color contact lens on the iris on the basis of the first feature amount and the second feature amount.

The authentication system 101 includes one or a plurality of capture devices 200.

Each device included in the authentication system 101 operates similarly to the already described related device.

The authentication system 101 configured as described above can obtain effects similarly to the implementation of authentication based on determination of the presence or absence of wearing the color contact lens in the image processing device 301.

The reason is as follows.

The capture device 200 captures images in a plurality of bands. The image processing device 301 determines the presence or absence of the color contact lens in the iris on the basis of the images in the plurality of bands. The authentication device 400 executes an authentication operation corresponding to the determination result. Then, the information processing device 500 executes processing corresponding to the authentication operation of the authentication device 400.

Note that the authentication system 101 has the minimum configuration of a system including the image processing device 301 that is the minimum configuration of the first example embodiment.

Some or all of the above example embodiments can be described as but are not limited to the following supplementary notes.

(Supplementary Note 1)

An image processing device including:

a first feature amount calculation unit that calculates a first feature amount in a first wavelength band using an image in the first wavelength band in an iris used for authentication of a person;

a second feature amount calculation unit that calculates a second feature amount in a second wavelength band using an image in the second wavelength band in the iris; and a covering object determination unit that determines presence or absence of a color contact lens on the iris based on the first feature amount and the second feature amount.

(Supplementary Note 2)

The image processing device according to supplementary note 1, in which the first wavelength band is a visible light band, and the second wavelength band is a near-infrared light band.

(Supplementary Note 3)

The image processing device according to supplementary note 1 or 2, in which the first feature amount is an average value of pixel values in the image in the first wavelength band, and the second feature amount is an average value of pixel values in the image in the second wavelength band.

(Supplementary Note 4)

The image processing device according to supplementary note 3, in which the first feature amount is an average value of pixel values in an image of a portion of wavelength band within the first wavelength band.

(Supplementary Note 5)

The image processing device according to any one of supplementary notes 1 to 4, in which the covering object determination unit that determines the presence or absence of the color contact lens based on a ratio of the first feature amount and the second feature amount.

(Supplementary Note 6)

An authentication system including:

a capture device configured to capture an iris used for authentication of a person using a first wavelength band and a second wavelength band;

an authentication device configured to authenticate the person using a determination result of presence or absence of a color contact lens on the iris;

an information processing device configured to execute processing based on an authentication result of the authentication device; and an image processing device including a first feature amount calculation unit that calculates a first feature amount in the first wavelength band using an image in the first wavelength band, a second feature amount calculation unit that calculates a second feature amount in the second wavelength band using an image in the second wavelength band, and a covering object determination unit that determines presence or absence of the color contact lens on the iris based on the first feature amount and the second feature amount.

(Supplementary Note 7)

The authentication system according to supplementary note 6, in which the capture device includes a transmitted light change element that changes a wavelength band of light transmitted based on a control signal, and a capture element that outputs an image based on the transmitted light of the transmitted light change element.

(Supplementary Note 8)

An image processing method including:

calculating a first feature amount in a first wavelength band using an image in the first wavelength band in an iris used for authentication of a person;

calculating a second feature amount in a second wavelength band using an image in the second wavelength band in the iris; and determining presence or absence of a color contact lens on the iris based on the first feature amount and the second feature amount.

(Supplementary Note 9)

An authentication method including:

by an image processing device included in an authentication system including a capture device configured to capture an iris used for authentication of a person using a first wavelength band and a second wavelength band, an authentication device configured to authenticate the person using a determination result of presence or absence of a color contact lens on the iris, and an information processing device configured to execute processing based on an authentication result of the authentication device, calculating a first feature amount in the first wavelength band using an image in the first wavelength band;

calculating a second feature amount in the second wavelength band using an image in the second wavelength band; and determining presence or absence of the color contact lens on the iris based on the first feature amount and the second feature amount.

(Supplementary Note 10)

A recording medium recording a program for causing a computer to execute:

processing of calculating a first feature amount in a first wavelength band using an image in the first wavelength band in an iris used for authentication of a person;

processing of calculating a second feature amount in a second wavelength band using an image in the second wavelength band in the iris; and processing of determining presence or absence of a color contact lens on the iris based on the first feature amount and the second feature amount.

(Supplementary Note 11)

A recording medium recording a program for causing a computer included in an authentication system including a capture device configured to capture an iris used for authentication of a person using a first wavelength band and a second wavelength band, an authentication device configured to authenticate the person using a determination result of presence or absence of a color contact lens on the iris, and an information processing device configured to execute processing based on an authentication result of the authentication device, to execute:

processing of calculating a first feature amount in the first wavelength band using an image in the first wavelength band;

processing of calculating a second feature amount in the second wavelength band using an image in the second wavelength band; and processing of determining presence or absence of the color contact lens on the iris based on the first feature amount and the second feature amount.

While the disclosure has been particularly shown and described with reference to the example embodiments thereof, the disclosure is not limited to these example embodiments. It will be understood by those of ordinary skill in the art that various changes in form and details may be made therein without departing from the spirit and scope of the disclosure as defined by the claims.

REFERENCE SIGNS LIST

100 Authentication system
101 Authentication system
110 Authentication system
200 Capture device
210 Capture device
211 Capture element
212 Optical filter
213 Transmitted light change element
300 Image processing device
301 Image processing device
310 Visible light band feature amount calculation unit
311 First feature amount calculation unit 320 Near-infrared light band feature amount calculation unit
321 Second feature amount calculation unit
330 Color contact lens determination unit
331 Covering object determination unit
340 Storage unit
400 Authentication device
500 Information processing device
600 Storage device
700 Information processing device
710 CPU
720 ROM
730 RAM
740 Internal storage device
750 IOC
760 Input device
770 Display device
780 NIC
790 Recording medium

What is claimed is:

1. An authentication system comprising:
a capture device configured to capture an iris used for authentication of a person using a first wavelength band and a second wavelength band;
an authentication device configured to authenticate the person using a determination result of presence or absence of a color contact lens on the iris;
an information processing device configured to execute processing based on an authentication result of the authentication device; and
an image processing device including:
a memory; and
at least one processor coupled to the memory,
the at least one processor performing operations to:
calculate a first feature amount in the first wavelength band using an image in the first wavelength band,
calculate a second feature amount in the second wavelength band using an image in the second wavelength band, and
determine presence or absence of the color contact lens on the iris based on the first feature amount and the second feature amount, wherein
the capture device includes:
a transmitted light change element that changes a wavelength band of light transmitted based on a control signal; and
a capture element that outputs an image based on the transmitted light of the transmitted light change element.

2. An authentication method comprising:
by an image processing device included in an authentication system including
a capture device configured to capture an iris used for authentication of a person using a first wavelength band and a second wavelength band,
an authentication device configured to authenticate the person using a determination result of presence or absence of a color contact lens on the iris, and
an information processing device configured to execute processing based on an authentication result of the authentication device,
calculating a first feature amount in the first wavelength band using an image in the first wavelength band;
calculating a second feature amount in the second wavelength band using an image in the second wavelength band; and
determining presence or absence of the color contact lens on the iris based on the first feature amount and the second feature amount, wherein
the capture device includes a transmitted light change element and a capture element, and
the authentication method further comprises:
changing a wavelength band of light transmitted based on a control signal by the transmitted light change element, and
outputting an image based on the transmitted light of the transmitted light change element by the capture element.

3. A non-transitory computer-readable recording medium storing a program for causing a computer included in an authentication system including
a capture device configured to capture an iris used for authentication of a person using a first wavelength band and a second wavelength band,
an authentication device configured to authenticate the person using a determination result of presence or absence of a color contact lens on the iris, and
an information processing device configured to execute processing based on an authentication result of the authentication device, to execute:
calculating a first feature amount in the first wavelength band using an image in the first wavelength band;
calculating a second feature amount in the second wavelength band using an image in the second wavelength band; and
determining presence or absence of the color contact lens on the iris based on the first feature amount and the second feature amount, wherein
the capture device includes a transmitted light change element and a capture element, and
the program is further for causing the computer to execute:
changing a wavelength band of light transmitted based on a control signal by the transmitted light change element, and
outputting an image based on the transmitted light of the transmitted light change element by the capture element.

4. The authentication system according to claim 1, wherein
the first wavelength band is a visible light band, and
the second wavelength band is a near-infrared light band.

5. The authentication system according to claim 1, wherein
the first feature amount is an average value of pixel values in the image in the first wavelength band, and
the second feature amount is an average value of pixel values in the image in the second wavelength band.

6. The authentication system according to claim 5, wherein
the first feature amount is an average value of pixel values in an image of a portion of wavelength band within the first wavelength band.

7. The authentication system according to claim 1, wherein the at least one processor performs the operations to further:
determine presence or absence of the color contact lens based on a ratio of the first feature amount and the second feature amount.

* * * * *